United States Patent
Yeh et al.

(10) Patent No.: US 6,304,960 B1
(45) Date of Patent: Oct. 16, 2001

(54) VALIDATING PREDICTION FOR BRANCHES IN A CLUSTER VIA COMPARISON OF PREDICTED AND CONDITION SELECTED TENTATIVE TARGET ADDRESSES AND VALIDATION OF BRANCH CONDITIONS

(75) Inventors: Tse-Yu Yeh, Milpitas; Michael Paul Corwin, Palo Alto; Judge K. Arora, Cupertino, all of CA (US); Sujat Jamil, Chandler, AZ (US); Sailesh Kottapalli, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/130,380

(22) Filed: Aug. 6, 1998

(51) Int. Cl.$^7$ ........................................ G06F 9/38
(52) U.S. Cl. .............................. 712/236; 712/239
(58) Field of Search ..................... 712/236, 239

(56) References Cited

U.S. PATENT DOCUMENTS

| | | | |
|---|---|---|---|
| 4,833,599 | 5/1989 | Colwell et al. | 712/236 |
| 5,333,280 | 7/1994 | Ishikawa et al. | 712/241 |
| 5,414,822 | 5/1995 | Saito et al. | 712/240 |
| 5,655,098 | 8/1997 | Witt et al. | 712/210 |
| 5,699,536 | 12/1997 | Hopkins et al. | 712/216 |
| 5,699,537 | 12/1997 | Sharangpani et al. | 712/217 |
| 5,796,998 | * 8/1998 | Levitan et al. | 712/239 |
| 5,826,070 | 10/1998 | Olson et al. | 712/222 |
| 5,903,750 | * 5/1999 | Yeh et al. | 712/236 |
| 5,964,869 | * 10/1999 | Talcott et al. | 712/236 |

OTHER PUBLICATIONS

Sharangpani, Harsh, Intel Itanium Processor Microarchitecture Overview, Intel p 1–23.

Shanley, Tom, "Pentium Pro Processor System Architecture", Mindstream, Inc., pp. 63, 66, 67, 80,89, and 109.

Sharangpani, Harsh et al., U.S. Pat. application No. 08/949,277 entitled Efficient Processing of Clustered Branch Instructions, filed Oct. 13, 1997.

\* cited by examiner

*Primary Examiner*—Kenneth S. Kim
(74) *Attorney, Agent, or Firm*—Leo V. Novakoski

(57) ABSTRACT

A system for validating branch predictions for clusters of branch instructions includes an address validation module and a condition validation module. The address validation module determines target addresses for the branches in the cluster. One of the determined target addresses is selected, using predicted branch directions. The selected target address is compared with a predicted target address, and resolved branch directions are compared with predicted branch directions. A misprediction is indicated if either comparison fails.

25 Claims, 11 Drawing Sheets

VALIDATING PREDICTION FOR BRANCHES IN A CLUSTER VIA COMPARISON OF PREDICTED AND CONDITION SELECTED TENTATIVE TARGET ADDRESSES AND VALIDATION OF BRANCH CONDITIONS

BACKGROUND OF THE INVENTION

1. Technical Field

This invention relates to microprocessors, and in particular to systems for processing branch instructions.

2. Background Art

Advanced processors employ pipelining techniques to execute instructions at very high speeds. In a pipelined processor, the overall machine is organized as a pipeline consisting of several cascaded stages of hardware. Instruction processing is divided into a sequence of operations, and each operation is executed by hardware resident in a corresponding pipeline stage ("pipe stage") in a single cycle of the processor clock. Independent operations from several instructions may be processed simultaneously by different pipe stages, increasing the instruction throughput of the pipeline. Where a processor pipeline includes multiple execution resources in each pipe stage, the throughput of the processor can exceed one instruction per clock cycle. Contemporary superscalar, deeply pipelined processors may have anywhere from 5 to 15 pipe stages and may execute operations from as 4 to 8 instructions simultaneously in each pipe stage.

In order to make full use of a processor's instruction execution capability, the processor must be provided with sufficient instructions from the correct execution path. As long as the correct execution path can be identified, instructions from this execution path can be loaded into the processor pipeline to keep the execution resources busy. Where program instructions are processed sequentially, it is a relatively simple matter to determine the correct execution path. Branch instructions can disrupt sequential execution by transferring control of the processor to a non-sequential target address when an associated branch condition is met. Many programs have branches every five or six instructions. As a result, a deeply pipelined processor may have two or three branch instructions in its pipeline at a given time, making determination of the correct execution path difficult. Moreover, branch conditions are typically not resolved until the back end of the processor pipeline, so the pipeline may begin processing instructions from incorrect execution paths before the error is discovered.

Processors typically include branch prediction systems at the front end of their pipelines to anticipate changes in the control flow due to taken branch instructions. Branch prediction systems use a variety of methods to predict whether a branch instruction entering the front end of the pipeline is likely to be taken when it is executed at the back end of the pipeline, e.g. whether the branch condition is likely to be met. For branch instructions that are predicted taken, instructions beginning at the associated target address may be loaded into the pipeline behind the branch instruction. As long as the branch is resolved taken when it is executed at the back end of the pipeline, the predicted instruction sequence that follows the branch instruction is from the correct execution path, and there is no disruption of the pipeline's operation. If the prediction is incorrect, the predicted instructions are not from the correct execution path. They must be flushed from the pipeline and instructions from the correct instruction path loaded.

Instructions from a predicted branch path must thus be checked at the back end of the pipeline and either validated or corrected. Typically, this is done by comparing the target address and branch condition from the executed branch instruction with the predicted target address and branch condition. When the comparisons match, no action need be taken since the instructions in the pipeline following the branch instruction represent the correct control flow. When the comparisons do not match, the pipeline must be flushed and reloaded with instructions from the correct execution path.

Validating branch predictions can consume additional clock cycles. For example, the branch information from the executed branch instruction is resolved in one stage of the pipeline, and typically compared with the predicted branch information no earlier than the next stage of the pipeline. In processors that support predication, branch conditions are frequently represented by predicates, and predicate evaluation is a critical path in the processor. Delays in validating predicted predicates can lengthen a critical timing path in the processor pipeline.

This problem is exacerbated in processors that execute code compiled by trace scheduling, superblock scheduling, and hyper block scheduling. These methods cause fall-through, i.e. not taken, branches to cluster at the end of a scheduled code block. The clustered branch instructions are generally executed and validated in sequence. Fall through branches do not effect the control flow of the processor and each one that is executed delays the pipeline by an additional clock cycle. Further, delays due to validating each fall through branch are compounded as well. The present invention addresses these and other problems associated with executing and validating branch instructions.

SUMMARY OF THE INVENTION

The present invention is a system and method for validating branch predictions in parallel with execution of the corresponding branch instructions. It is especially suitable for use with branch processing systems capable of executing clustered branch instructions concurrently.

In accordance with the present invention, a branch validation system includes a target validation module and a condition validation module. The target validation module determines a target address for validation, using predicted branch condition information and compares the target address to a predicted target address. The condition validation module compares predicted and resolved branch condition information, and generates a flush signal when either comparison indicates a mismatch.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention is a system and method for validating branch predictions concurrently with execution of the corresponding branch instructions. It is particularly advantageous to branch processing systems that support concurrent processing of clustered branch instructions in combination with aggressive prediction strategies to achieve high performance.

In accordance with the present invention, the branch validation system validates the target address and branch direction (Taken/Not Taken status) in parallel, allowing the validation results to conclude as branch execution completes. This is accomplished by employing predicted condition information to determine a target address for validation. Target address validation is thus decoupled from branch condition validation, allowing them to proceed in parallel.

Figure 1:
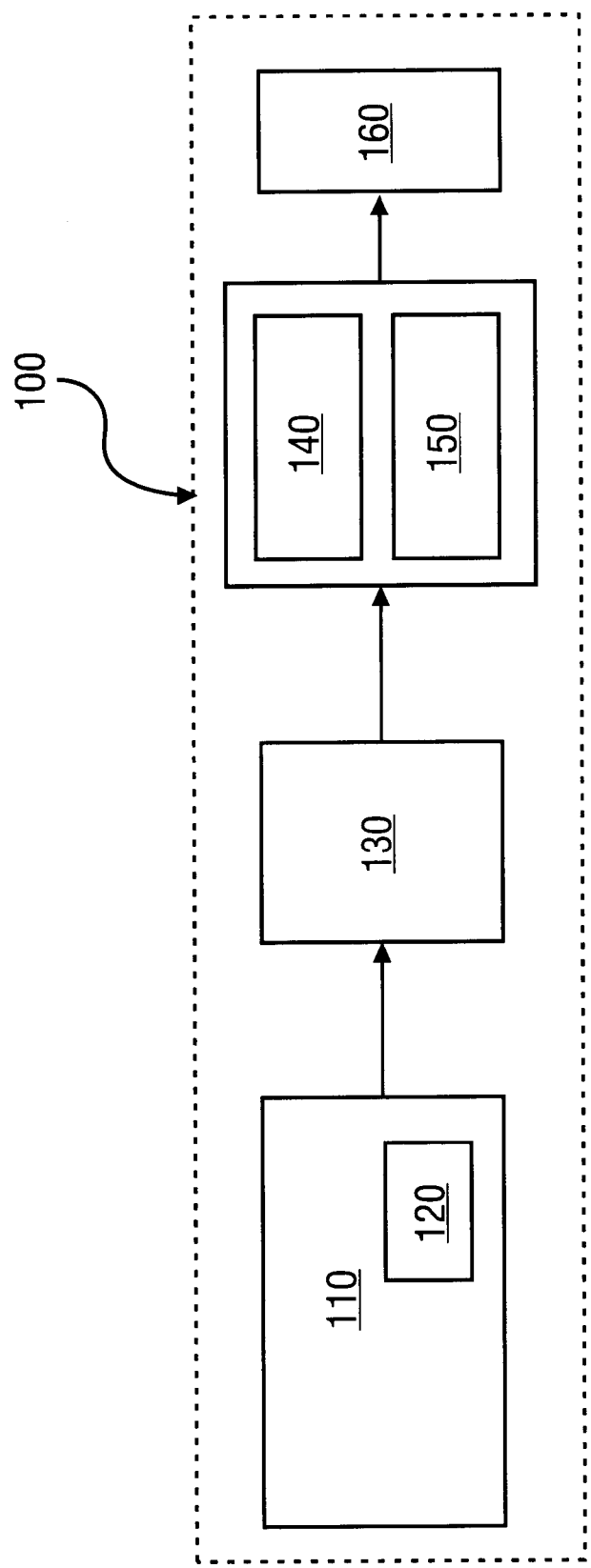
FIG. 1 is a block diagram of one embodiment of a processor pipeline that includes a branch validation system in accordance with the present invention.

FIG. 1 is a block diagram of one embodiment of a processor pipeline 100 that incorporates a branch validation module 170 in accordance with the present invention. Processor pipeline 100 includes an instruction fetch module 110, a branch prediction module 120, an instruction decode module 130, branch processing system 140, execution resources 150, and an exception/commit module 160. Execution resources 150 represents non-branch execution units that are typically present in a processor pipeline. These include floating point execution unit(s) (FPU), integer execution unit(s) (IEU), and memory execution units. Exception/commit module 160 monitors pipeline events to determine whether to commit the results of instructions to the architectural state of the processor.

For the disclosed embodiment, branch validation module 170 is shown incorporated in branch processing system 140. However, this is not required. Branch validation module 170 may be implemented separately from branch processing system 140 or in any other association that allows rapid communication between the two systems.

Fetch module 110 fetches instructions for processing by pipeline 100. To facilitate fetching and branch prediction operations, instructions may be identified through instruction pointers (IPs). Fetch module 110 provides IPs to branch prediction module 120, which accesses branch prediction information, when available, for those IPs that represent branch instructions. Branch prediction information indicates whether a branch is likely to be taken (branch direction). It typically also indicates a predicted target address, i.e. an address to which the branch instruction transfers control when it is taken. The predicted target address points to one or more target instructions that may be loaded into the pipeline 100 when the branch is predicted taken. For one embodiment, branch prediction module 120 predicts a first taken branch for a cluster of branch instructions and a target address associated with the first taken branch.

As long as the predicted branch information is accurate, pipeline 100 operates on a seamless flow of instructions. The alternative, fetching the target instructions when the branch instruction is executed by branch processing system 140 at the back end of pipeline 100, leaves the resources in pipeline 100 under utilized.

Instructions are decoded in decode module 130 and directed to appropriate execution resources according to their instruction type. Branch instructions are directed to branch processing system 140 where each is executed to determine the next instruction on the execution path and any side effects on the architectural state. For example, a conditional branch instruction specifies a target address and a branch condition. When the branch instruction is executed, processor control jumps to the instruction at the target address if the branch is taken or falls through to the instruction that follows the branch instruction if the branch is not taken. The branch condition determines whether the branch is taken or not taken, i.e. the branch direction. The target address may be specified by a pointer to a register (indirect branch) or as an offset from the IP of the branch instruction (IP-relative branch). The branch direction may be specified through a variable to which the branch instruction points. The variable is typically stored in a register that is written by compare instructions.

For one embodiment of the present invention, branch instruction module 140 is capable of executing one or more branch instructions concurrently and identifying a first taken branch instruction from among the concurrently executed branch instructions.

If no exceptions/faults are detected, the architectural state is updated to reflect the effects of the first taken branch. Branches following the first taken branch in the cluster are ignored. Branches that precede the first taken branch in the cluster are fall-through branches. Generally, fall-through branches have no effect on the architectural state. Loop branches, which adjust various loop counters even when they fall-through, are an exception.

For the present invention, branch validation module 170 compares predicted branch information (TK/NT status, target address) with resolved branch information from processed branch or branch-related instructions. When the predicted and resolved branch information do not match, instructions loaded into processor pipeline 100 based on the predicted information are not from the correct execution path. In this case, processor pipeline 100 is flushed and fetch module 110 is resteered to the correct instructions. When the predicted and actual branch information match, instructions in processor pipeline 100 are from the correct execution path and processing proceeds uninterrupted.

Figure 2:
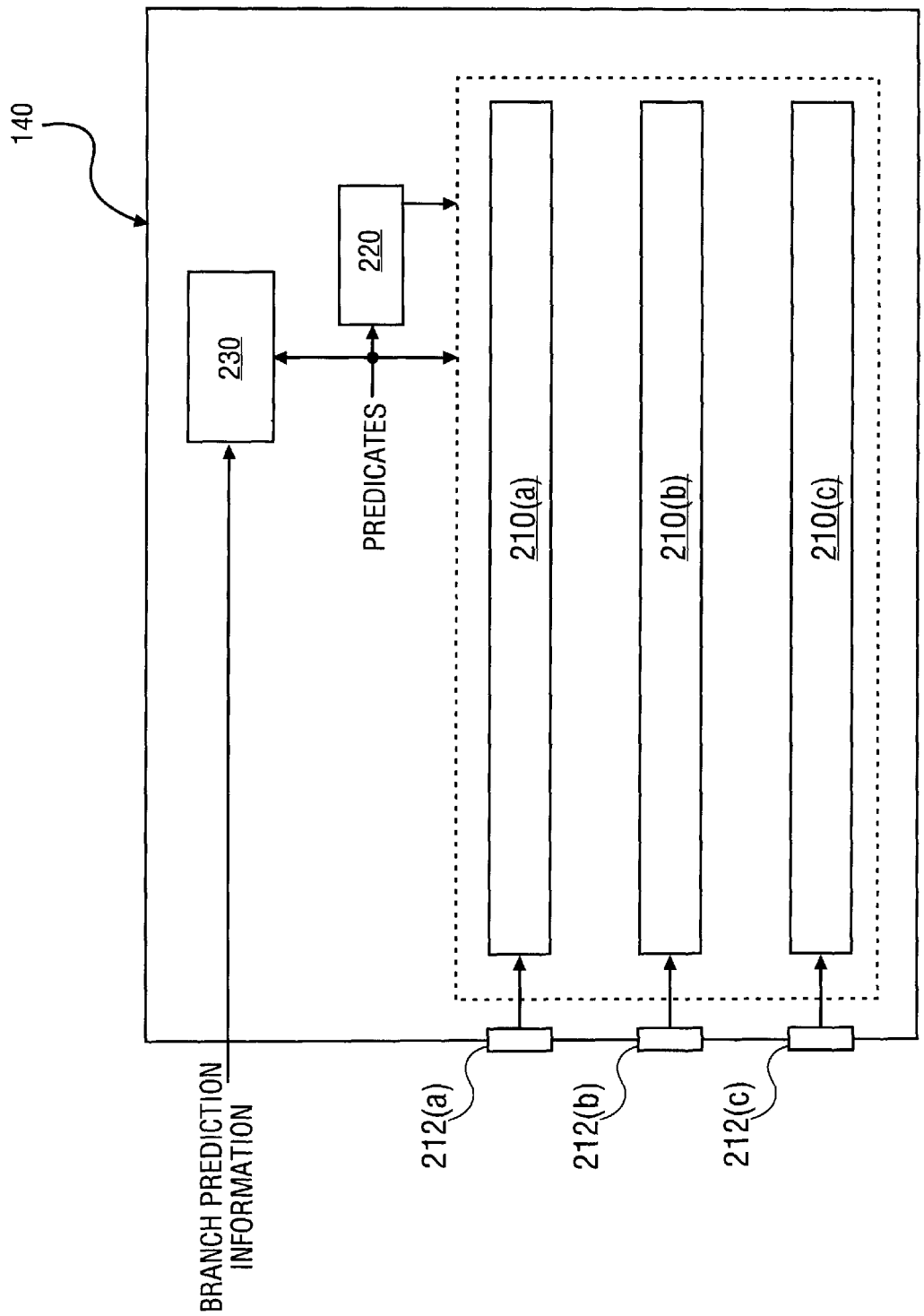
FIG. 2 is a block diagram of one embodiment of a branch processing system in accordance with the present invention.

FIG. 2 is a block diagram of one embodiment of a branch processing system 140 in accordance with the present invention. Branch processing system 140 includes multiple branch execution pipelines 210(a), 210(b), 210(c) (collectively, "pipelines 210") and linking logic 220. Also shown are ports 212(a), 212(b), 212(c) for providing branch instructions to associated pipelines 210(a), 210(b), 210(c), respectively, and a validation module 170. FIG. 2 illustrates the invention for the case where clusters of up to three branch instructions may be processed simultaneously. However, the present invention is not limited to this configuration, and may be modified to process any number of branch instructions concurrently.

Each pipeline 210 executes a branch instruction to determine the branch direction, the target address, and any side effects the branch on the architectural state. Examples of side effects are return addresses calculated on execution of call branches and loop variables calculated on execution of loop branches. The latter include loop counters (L,C), which track the iterations of associated loops, and epilog counters (EC), which track the number of stages remaining in software pipelined loops. Since multiple branch instructions may be executed concurrently and only the first branch in execution order is committed to the architectural state, side effects for each taken branch are maintained in a speculative state until linking logic 220 determines which branch, if any, is the first taken branch in the cluster.

Branch execution pipelines 210 and various resources of pipeline 100 determine branch directions, branch target addresses, and any side effects. For one embodiment of the invention, branch directions for, e.g., calls, returns, instruction set switches, and returns from interrupts (RFIs) are determined by predicates which are written by compare instructions. Each compare instruction is executed in conjunction with its corresponding branch instruction by, for example, IEU or FPU 150. For one embodiment of the invention, the result of the compare operation is represented by a value that is stored in a predicate register. The predicate register is indicated by a condition field of the branch instruction. The branch direction of loop branches may be determined by loop variables alone or in combination with predicates, depending on the type of loop.

Linking logic 220 employs resolved branch information associated with each executed branch instruction of a cluster to identify the first branch instruction in execution order that is resolved taken, i.e. first taken branch instruction (FTB) of a cluster. For one embodiment, the resolved branch information is provided as predicates by a predicate delivery unit and, in the case of loop instructions, as logical combinations of predicates and/or counter variables. Linking logic 220 uses this information to select a target address associated with the FTB. The selected target address may be used to resteer the pipeline in the event of a branch misprediction.

For one embodiment of the invention, FTB identification is simplified by assigning branch instructions to pipelines 210(a), 210(b), 210(c) according to their order of execution. Here, execution order refers to the order in which the branch instructions of a cluster are encountered in the code segment. For a cluster of three branch instructions in the disclosed embodiment, pipeline 212(c) is assigned to the branch instruction that is third in execution order, pipeline 212(b) is assigned to the branch instruction that is second in execution order, and pipeline 212(a) is assigned to the branch instruction that is first in execution order. In a cluster of two branch instructions, pipeline 212(c) is assigned to the branch instruction that is second in execution order and pipeline 212(b) is assigned to the branch instruction that is first in execution order. Similar assignments apply for different numbers of pipelines and corresponding branch cluster sizes.

With this assignment strategy, linking logic 220 can identify the FTB through a priority selection scheme. For example, branch directions associated with branch instructions in pipelines 210 may be examined sequentially, beginning with pipeline 210(a). The first taken branch identified in this order is the first taken branch in execution order, i.e. the FTB.

Branch validation module 170 is associated with branch execution pipelines 210 and linking logic 220 to support aggressive branch prediction strategies. Validation module 170 receives the predicted branch information from branch prediction module 140 and compares it with branch resolution information provided by branch processing system 140. Validation module 170 receives predicted branch information for a cluster from branch prediction module 120 and compares it with branch information generated by processing branch instructions from the cluster (resolved branch information). When the predicted and resolved information for a FTB match, the instructions that follow the FTB are from the correct execution path, and validation module 170 allows branch processing system 140 to proceed. When the predicted and resolved branch information do not match, validation module 170 flushes pipeline 100 and triggers the front end of the pipeline to access target instructions from the correct execution path. For one embodiment of the invention, validation module 170 causes the target address selected by linking logic 220 to be transferred to the front end of pipeline 100.

Once an FTB has been validated and no faults or exceptions have been generated by instructions preceding the FTB, side effects associated with the FTB are transferred from a speculative state to the architectural state of the program thread. Side effects of any branches that follow the FTB are ignored, regardless of the branch directions. Side effects of any non-loop fall-through branches that precede the FTB are also ignored, while those of loop branches may update one or more loop counters.

Figure 3:
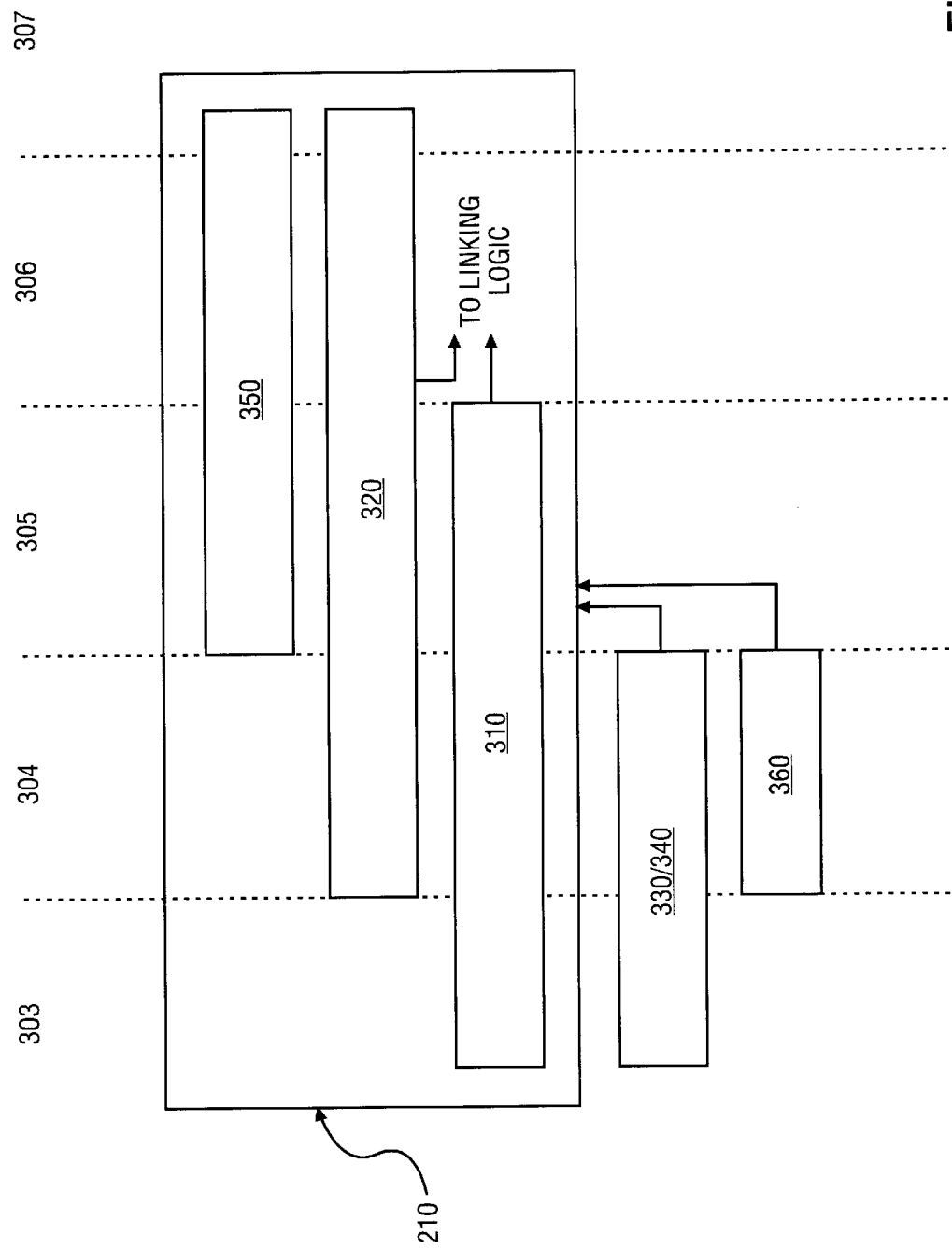
FIG. 3 is a block diagram illustrating one embodiment of the branch execution pipeline of FIG. 2.

FIG. 3 shows one embodiment of a branch execution pipeline 210 of FIG. 2. Pipeline stages 303–307 are shown in FIG. 3 to indicate when branch operations occur at various points along pipeline 210. In the absence of pipeline stalls or faults, successive stages of pipeline 100 operate on an instruction on successive cycles of the processor clock. The pipeline of FIG. 3 is provided for illustration only. The present invention may be implemented in pipelines having different numbers of pipe stages and distributions of resources among the pipe stages.

For the disclosed embodiment, execution pipeline 210 includes a target address module 310, a call/return module 320, and an optional loop execution module 330. Also shown area predicate delivery module 360 and register read/write modules 340/350, which operate in conjunction with pipelines 210 to resolve branch instructions. For example, read/write modules 340/350 couple indirect branch target addresses, LC values, an EC values, between modules 310, 320, 330 and various registers associated with pipeline 100. Predicate delivery module 360 provides predicates to various components of branch processing system 140. The modules of FIG. 3 are shown separately to highlight their different functions. However, their functions may overlap and they may be combined in different ways to achieve the same results.

Target address module 310 generates a target address for a branch instruction as it transits stages 303–305. For the disclosed embodiment, target addresses for IP-relative and indirect branches may be generated in stage 303. In addition, target addresses for indirect branches may be by-passed into target address module 310 at stages 304 or 305.

Call/return module 320 includes additional resources for processing call and return branch instructions. For example, it generates a return address in stage 303 for a call instruction and makes the return address available for storage or use by other pipeline resources. For the disclosed embodiment, the return address may be written to a branch (BR) register at stage 306, by-passed to other resources at intervening stages, or coupled to linking logic 220 as necessary. Call/return pipeline 320 also saves and restores architectural state data, e.g. privilege levels, loop variables, etc., on call and return branches, respectively.

Loop execution module 330 provides the additional resources necessary to process loop type branch instructions. For example, these resources update side effects associated with loop execution, LC, EC, etc., and resolve branch directions for loop branches. For one embodiment of the invention, only one of execution pipelines 210 is provided with loop module 330, and loop branch instructions are directed to this pipeline 210 for processing. This eliminates the need to reproduce the loop hardware in all pipelines 210. It also simplifies the hardware necessary to suppress instructions in the cluster that follow the FTB.

Figure 4:
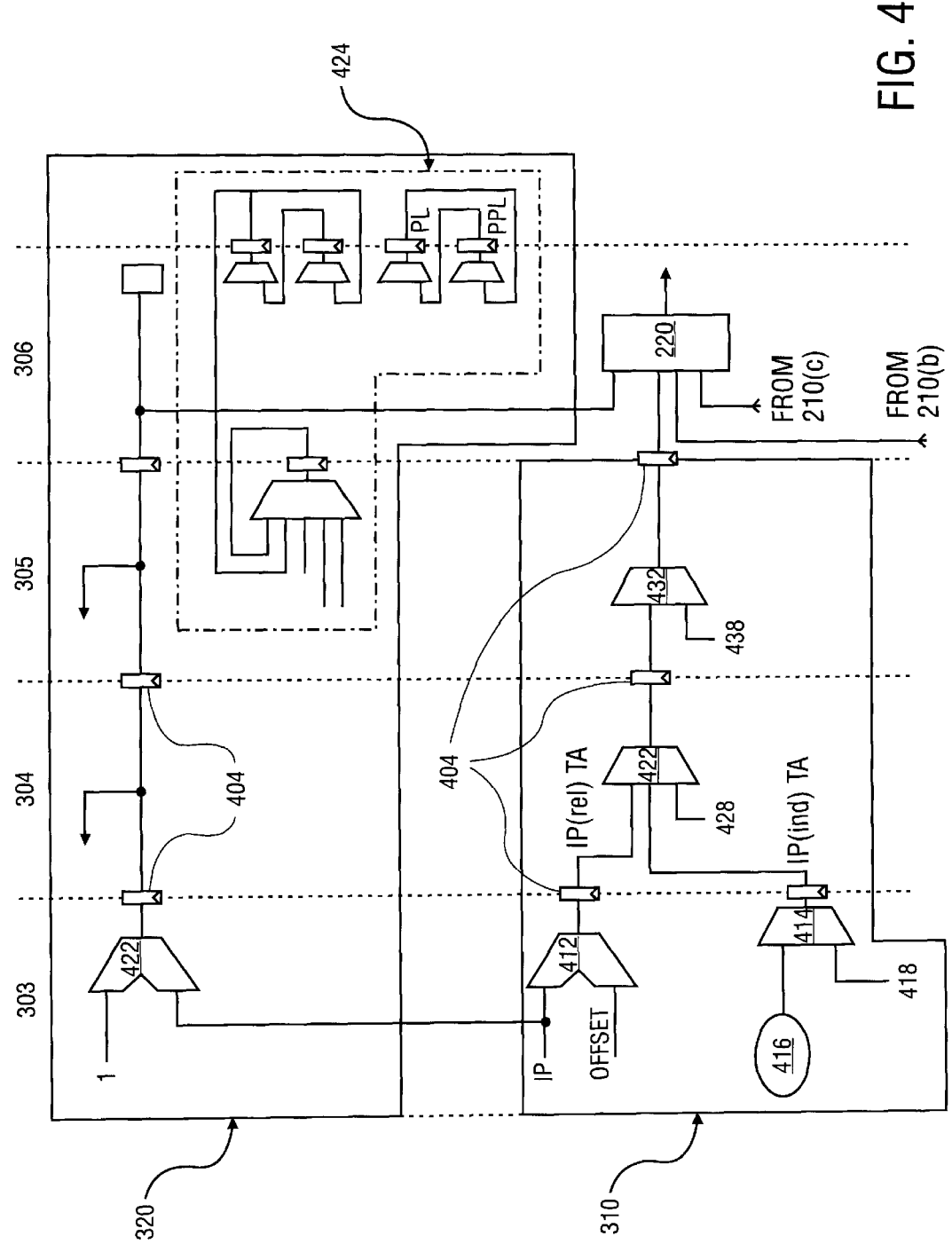
FIGS. 4 is a circuit diagram illustrating embodiment of the address and return pipelines of FIG. 3.

FIG. 4 illustrates in greater detail one embodiment of target address and call/return modules 310, 320, respectively, suitable for use with the present invention. The disclosed embodiment of address module 310 includes an adder 412 to generate target addresses for IP-relative branch instructions and a multiplexer (MUX) 414 to select a target address source for indirect branch instructions. The source may be a branch register (BR) 416 or a by-pass input 418. At stage 304, a MUX 422 selects adder 412, MUX 414, or by-pass input 428 as the target address source, according to the branch instruction type and timing considerations. MUX 432 selects between a target address from stage 304 or one provided through by-pass input 438 in stage 305. The target address from module 310 (and target address modules in other branch pipelines 210) are coupled to linking logic 220 for selection in stage 306. Latches 404 stage data across the different pipe stage boundaries.

Call/return module 320 includes an adder 422 in stage 303 that generates a return address for a call branch instruction. Arrows in stages 303 and 304 represent by-passes available to couple the return address to various stages in this and other branch execution pipelines 210. The return address may also be coupled to linking logic 220 in stage 305. Block 424 represents components of call return pipeline 320 that update loop and privilege level (PL) variables to reflect call/return activity. For example, block 424 saves an architectural value of PL as a previous PL (PPL) on execution and commitment of a return branch instruction. The architectural value of PPL is restored to PL on execution and commitment of a return branch instruction. Block 424 is discussed in greater detail in conjunction with FIG. 5.

Figure 5:
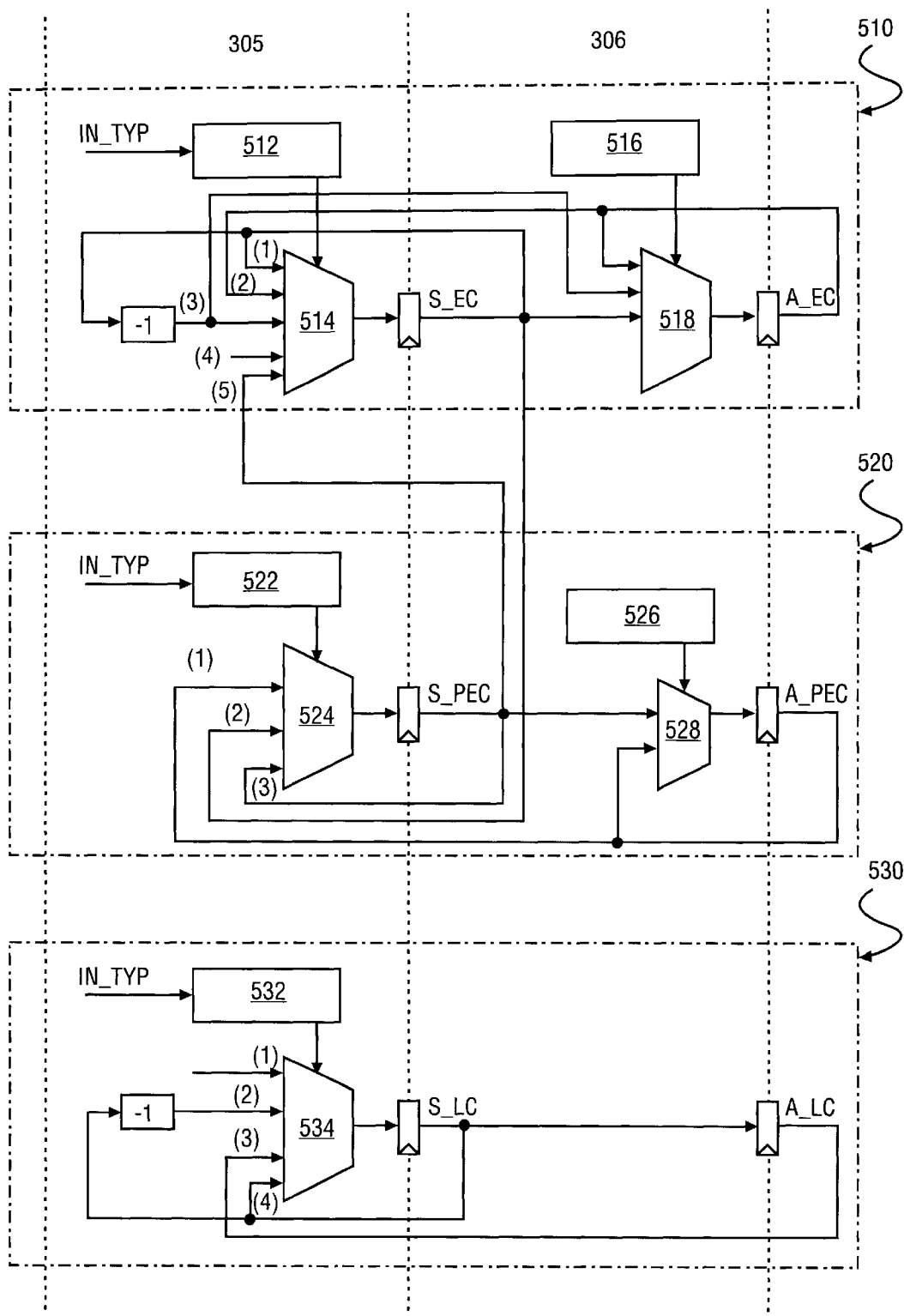
FIG. 5 is a circuit diagram illustrating one embodiment of the loop pipeline of FIG. 3.

FIG. 5 illustrates one embodiment of loop module 330 suitable for use in the present invention. Loop module 330 includes an EC update module 510, a previous EC (PEC) update module 520, and an LC update module 530. EC update module 510 includes logic for updating speculative and architectural values of a loop EC (S_EC and A_EC, respectively) to reflect branch and move instructions executed by branch processing system 140. PEC update module 520 and LC update module 530 perform similar update operations for speculative and architectural values of PEC and LC, respectively. Pipe stages 305, 306 are shown for reference.

Various types of loop instructions that may be processed by loop module 330 are identified in Table 1 along with the predicate/loop variable values for which the branch is taken.

TABLE 1

| BRANCH TYPE | TAKEN CONDITION |
|---|---|
| CLOOP | LC != 0 |
| CTOP | LC > 0 \|\| EC > 1 |
| CEXIT | LC = 0 && EC ≦ 1 |
| WTOP | PR == 0 \|\| EC > 1 |
| WEXIT | PR == 1 && EC ≦ 1 |

Here, CLOOP is a counted loop, CTOP is a modulo-scheduled (software pipelined) counted loop in which the branch direction is resolved at the bottom of the loop body, and CEXIT is a modulo-scheduled counted loop in which the branch direction is resolved somewhere other than the bottom of the loop. WTOP and WEXIT are modulo-scheduled while loops corresponding to the counted loops, CTOP and CEXIT, respectively.

In EC update module 510, a state machine 512 receives an instruction type signal (IN_TYP) along with any necessary predicate or speculative LC (S_LC) values and selects an appropriate mode to update the speculative EC (S_EC) value responsive to the received signals/values. The output of state machine 512 is coupled to the control input of a MUX 514 to update S_EC. For the disclosed embodiment of loop module 330, S_EC is: (1) unchanged by default; (2) updated to the architectural EC (A_EC) value when a flush or reset occurs in the previous cycle; (3) decremented when the epilog portion (S_LC=0, S_EC≠0) of a first taken CTOP/CEXIT branch is in stage 305 or when the epilog portion (PR=1, S_EC≠0) of a first taken WTOP/WEXIT branch is in stage 305; (4) updated to a by-passed EC value when a committed mov_to_EC instruction is in stage 305 of read/write module 340 or when a committed mov_to_PFS (previous function state) instruction is in stage 305 of read/write module 340 and a taken return is in stage 305; or (5) updated to a Previous EC value (PEC) when a taken return branch is in stage 305. Depending on timing constraints, it may be necessary to use predicted predicate values to determine whether the CTOP, CEXIT, WTOP, or WEXIT branch is the FTB in case (3).

A state machine 516 updates A_EC via MUX 518 with the current A_EC value by default or with the S_EC value. In the latter case, the A_EC value is updated to the by-passed EC value, the decremented EC value, or the PEC value when conditions (4), (3), or (5), respectively, are updated to stage 306.

In PEC update module 520, a state machine 522 selects an appropriate update mode for the speculative PEC (S_PEC) according to various input signals on each clock cycle. PEC is typically updated in response to call or return type branch instructions, which cause a current EC value to be saved or retrieved, respectively. For the disclosed embodiment, S_PEC is: (1) updated with the current A_PEC value when a flush or reset occurs in the previous cycle; (2) updated with the current S_EC value when a first taken call occurs in 305; or (3) updated with the S_PEC by default. A state machine 526 controls MUX 518 to retain the current value for A_PEC or to update A_PEC to the current value of S_PEC when conditions (1), (2), or (3) are updated to stage 306.

In LC update module 530, a state machine 532 updates S_LC through MUX 534 according to the state received signals/values on each clock cycle. For the disclosed embodiment, S_LC is: (1) updated to a by-passed LC value when a committed move is detected in stage 305; (2) decremented when a first taken CLOOP, CTOP, or CEXIT branch is in stage 305 and S_LC≠0, (3) updated to A_LC when a flush or reset event is detected on the previous cycle; and (4) unchanged when no update event is detected. Depending on timing constraints, it may be necessary to use predicted predicate values to determine that the CLOOP, CTOP, or CEXIT branch is the FTB for case (3).

A_LC is updated by the S_LC value according to which source updated Spec LC and the state of commit signals. In case (1), the by-passed value must be from a committed MOV_to_LC instruction. In case (2), the update must be from the FTB. If neither of these cases is detected, the current A_LC value is maintained.

For one embodiment of the invention, loop module 330 is present in the pipeline that processes the last branch instruction in execution order, e.g. pipeline 210(*c*) in the disclosed embodiment, and all loop type branches are directed to pipeline 210(*c*). This ensures that in any branch cluster that includes a loop instruction, the loop instruction will be last in execution order. This minimizes the use of loop execution resources in all cases in which an earlier branch instruction in a cluster is taken. It also eliminates the need to suppress branch instructions from the same cluster, i.e. concurrently processed branch instructions, following a first taken loop branch. The relatively complex nature of loop branches would otherwise impose sever timing constraints on this process.

For another embodiment of the invention, logic for implementing RFIs may also be included only in pipeline 210(*c*) and RFIs may be routed to this pipeline by decoder module 120. RFIs are singled out because they are processed at an instruction granular level, so that locations within a cluster or bundle of instructions must be tracked. A register associated with interrupt/exception logic may b used for this purpose. The other branches are processed at a cluster or bundle granular level, and only the starting address of the bundle need be tracked. For example, on completion of an interrupt, an RFI is executed and control is returned to the next instruction in execution order. This may be an instruction in the same bundle/cluster. One the other hand, following any other branch control is passed to the first instruction in the bundle/cluster indicated by the branch target address.

For the disclosed embodiment, sufficient information is available by stage 305 to resolve branch instructions in pipelines 210 and determine their side effects. Linking logic 220 monitors this resolution information for each branch instruction in pipelines 210 and identifies the FTB, if any, in a cluster of branch instructions.

Figure 6A:
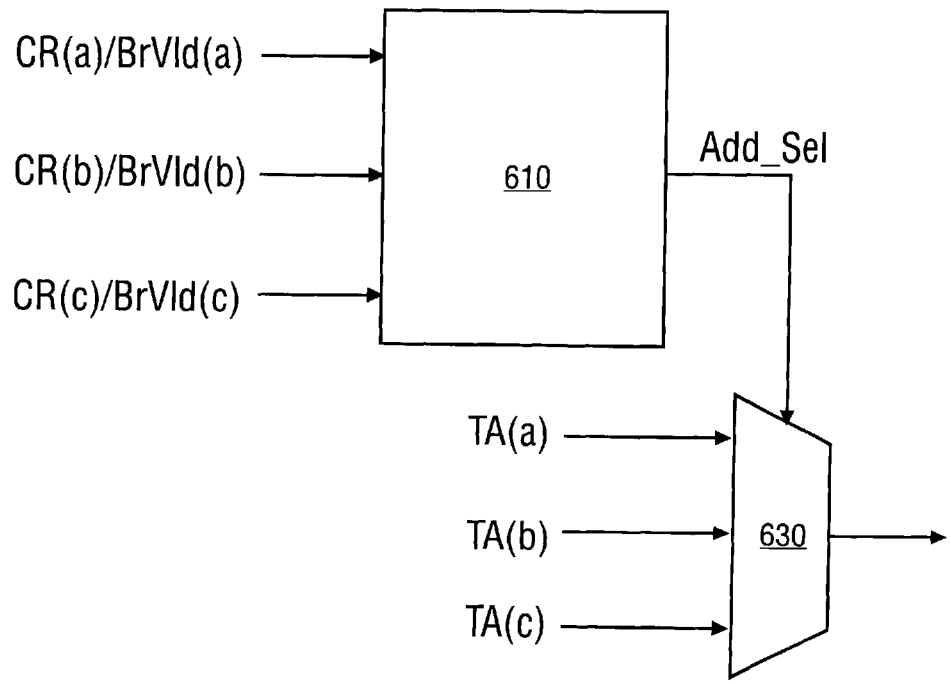
FIGS. 6A and 6B are circuit diagrams illustrating one embodiment of the linking logic of FIG. 2.

FIG. 6A illustrates one embodiment of linking logic 220 for the case in which three branch execution pipelines 210 are available and only pipeline 210(*c*) includes loop execution module 330. The disclosed embodiment of linking logic 220 includes a state machine 610 and a MUX 630. State machine 610 receives as input condition resolution and valid branch signals, e.g. CR(a)/BrVld(a), CR(b)/BrVld(b), CR(c)/BrVld(c), for pipeline 210 and outputs an address select signal (Add_Sel) that identifies the first branch instruction in execution order that is resolved taken (FTB). For non-loop branch instructions, CR may be a predicate provided by PDU 360. For loop branch instructions, CR(c) is the logical combination of predicate, EC, and LC values indicated in Table 2 for the loop branch type. To reduce timing constraints, S_EC and S_LC and predicated predicate values may be used to determine CR(c). Add_Sel is coupled to a control input of MUX 630, and target addresses from pipelines 210(*a*), 210(*b*), 210(*c*), e.g. TA(*a*), TA(*b*), TA(*c*), are coupled to data inputs of MUX 630. State machine 610 uses MUX 630 to select the target address corresponding to the FTB.

Figure 6B:
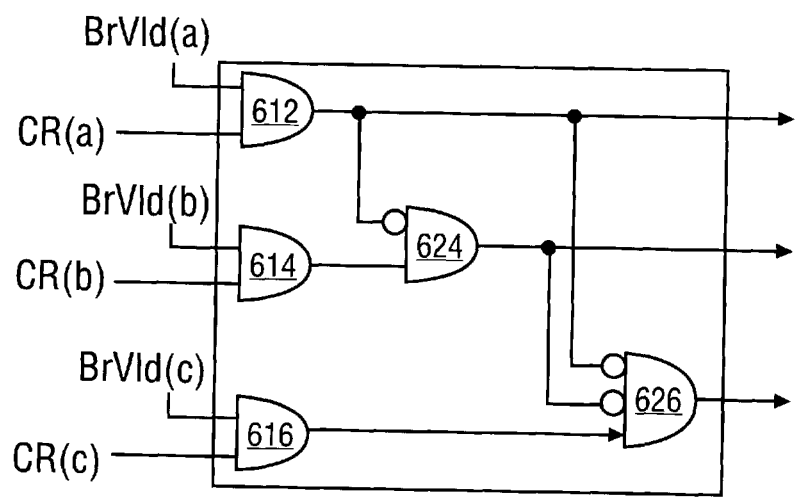

FIG. 6B illustrates one embodiment of state machine 610 for the case in which only pipeline 210(*c*) includes loop module 330, and branches are assigned to pipelines 210(*a*)–210(*c*) in execution order, beginning with pipeline 210(*c*) for single branch clusters, pipeline 210(*b*) for two branch clusters, and pipeline 210(*c*) for three branch clusters. In this embodiment, BrVld(a), (b), and (c) enable AND gates 612, 614, 616, respectively, when valid branch instructions are in pipelines 210(*a*), 210(*b*), and 210(*c*). AND gates 612, 624, and 626 generate an asserted signal on an output corresponding to the FTB.

As noted above, branch prediction module 120 generates predicted branch information at the front end of pipeline 100. This information is used to anticipate changes in the instruction flow through pipeline 100 before branch processing system 140 executes the branch instructions that actually determine changes in control flow. For one embodiment of the present invention, branch prediction module 120 identifies a predicted FTB (if any) and associated target address for a branch cluster. Instructions beginning at the predicted target address are prefetched into pipeline 100. Provided the prediction is correct, pipeline 100 processes the FTB and its target instructions without interruption, despite the change in control flow.

For one embodiment of the invention, branch validation module 170 checks the validity of branch prediction information against the branch information generated when the branch instructions are actually executed. As long as the predicted and resolved branch information matches, branch validation module 340 does not interfere with pipeline 100. If a mismatch is detected, branch validation module 240 triggers a pipeline flush and a resteer to instructions on the correct execution path.

Figure 7:
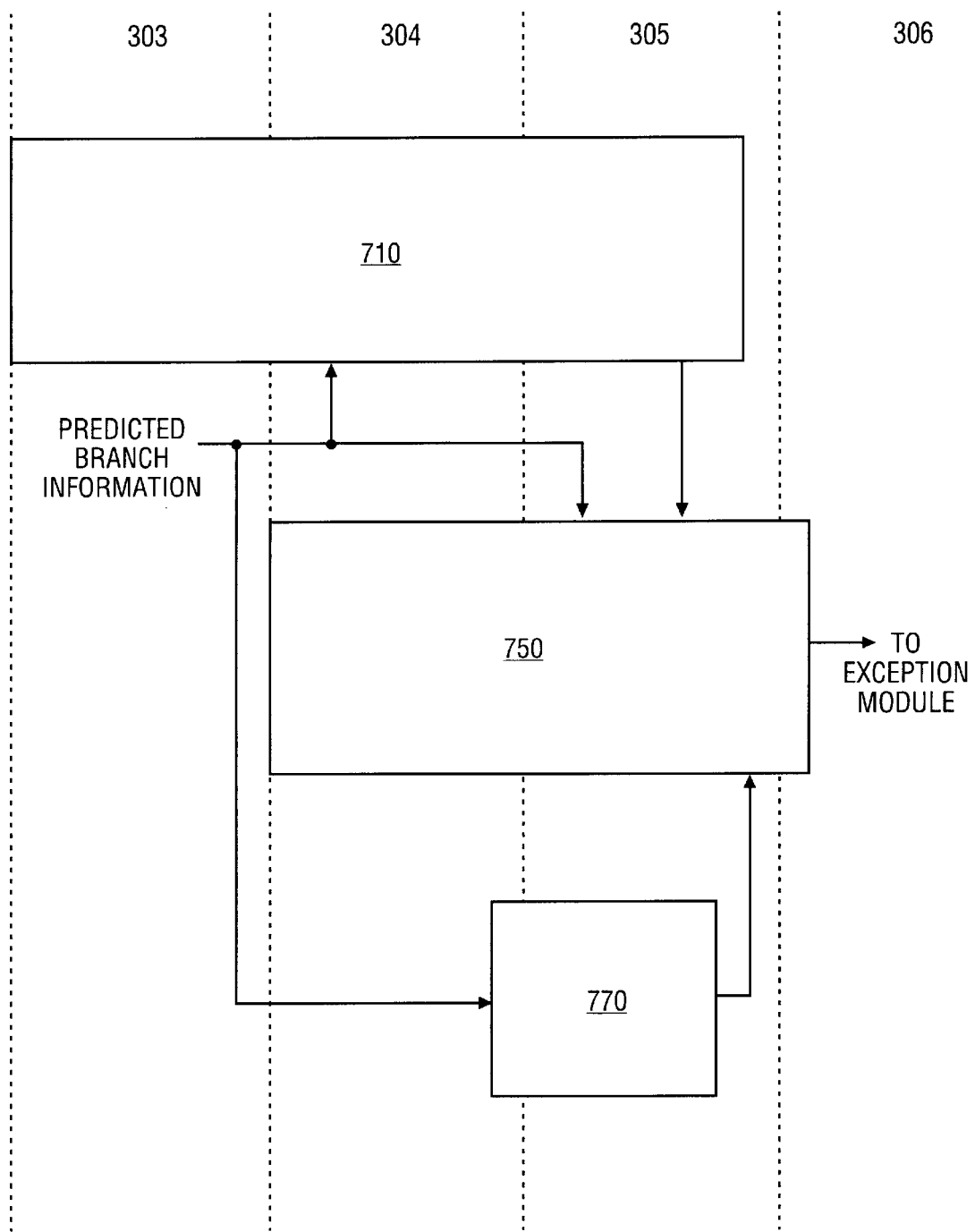
FIG. 7 is a block diagram of one embodiment of the validation module of FIGS. 1 and 2.

FIG. 7 is a block diagram of one embodiment of branch validation module 230 in accordance with the present invention. The disclosed embodiment of branch validation module 230 includes a target check module 710, a predicate check module 750, and a loop check module 770 to check predicted target addresses, non-loop branch directions, and loop branch directions, respectively, against values determined by executing the corresponding branch instructions. Branch validation module 230 is shown with respect to pipeline stages 303–306 to indicate the timing of its operations relative to those of branch execution pipelines 210.

Branch validation module 230 is described for the case in which branches and other conditional operations are represented by predicates. However, it is readily applicable to other systems for representing conditional operations, and "condition" and "predicate" are used interchangeably throughout this discussion.

The disclosed embodiment of branch validation module 170 validates the predicted branch information by the end of stage 305, when resolved branch information is available from pipelines 210. To accomplish this, target check module 710 uses predicted predicate values to calculate an "actual" target address, i.e. the target address of the FTB, and predicate check module 750 independently checks the predicted predicate values. An error in the actual target address attributable to an incorrectly predicted predicate is identified by predicate check module 750.

Figure 8:
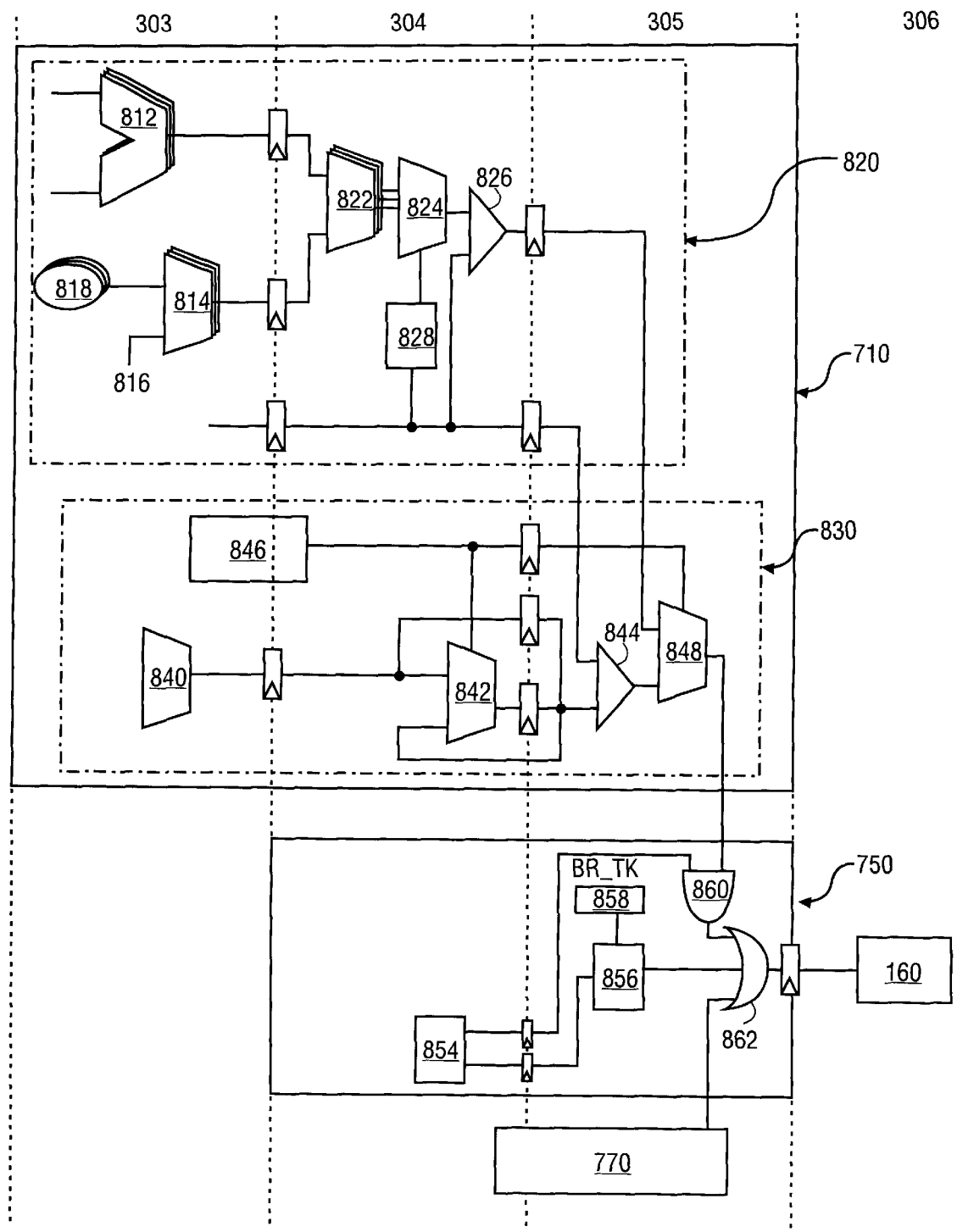
FIG. 8 is a more detailed diagram of one embodiment of the branch validation module of FIG. 7.

FIG. 8 illustrates in greater detail one embodiment of branch validation module 170. For the disclosed embodiment, target check module 710 includes first and second address generators 820 and 830, respectively, to calculate the "actual" addresses of branch instructions in the pipeline. First generator 820 determines target addresses for IP relative and indirect branches for which data is available, including those in which the target address is by-passed from instructions in stages 305 and 306. Second generator 830 determines target addresses for more tightly constrained bypasses. These includes target addresses that are provided in the same cycle as the dependent branch instruction or one cycle before the dependent branch instruction.

First generator 820 includes an adder 812 and a MUX 814 in stage 303 for each branch execution pipeline 210. For the disclosed embodiment, first generator 820 can process up to three target addresses in stage 303. Adder 812 determines target addresses for IP relative branch instructions and MUX 814 selects target addresses for indirect branch instructions from branch registers 818 and bypass input 816. At stage 304, a MUX 822 is provided for each branch execution pipeline 210 to select a target address from adder 812 or MUX 814, according to whether the branch instruction in the pipeline is an IP relative or indirect branch instruction, respectively.

In the exemplary embodiment of branch processing system 140, sufficient information is available to determine the actual ("resolved") FTB at the end of stage 305. In order to provide timely validation, validation module 170 employs predicted branch information to select a target address from among the target addresses calculated for the concurrently processed branch instructions. For this purpose, the disclosed embodiment of branch validation module 170 includes a second MUX 824 at stage 304 to select one of the target addresses provided by MUXs 822. In order to limit timing constraints, a state machine 828 receives predicted predicate information (P_PRD) from, e.g., branch prediction module 120, determines a predicted FTB, and selects an "actual" target address via MUX 824 using the predicted FTB. The selected target address is coupled to a comparator 826, which compares it against a predicted target address (P_TA). The result of the comparison is provided to an input of MUX 848 in stage 305.

For one embodiment of the invention, state machine 828 may be a set of logic gates as shown in FIG. 6B, with inputs CR(a), CR(b), CR(c) provided by prediction module 120 rather than PDU 260 or execution units 160.

Second generator 830 generates a target address using data by-passed from operations in stages 303 or 304. Comparator 844 compares the generated target address with the predicted target address, and provides the result to another input of MUX 848. A control block 846 determines when time critical bypass data is being provided and selects the appropriate target address comparison result via MUX 848. The output of MUX 848 indicates whether the "actual" address (based on predicated predicate values) and the predicted target address match.

The disclosed embodiment of predicate validation module 750 includes a validation control block 854, a predicate validation block 856 having an input 858 for receiving by-passed predicate values, an AND gate 860, and an OR gate 862. Validation control block 854 receives predicted predicates for the branch instruction(s) being processed, determines whether a branch instruction is predicted taken and if so, which branch execution pipeline 210 has the predicted FTB. A BR_TK signal line coupled to an input of AND gate 860 is asserted when the current cluster includes an FTB. In this embodiment, AND gate 860 asserts its output when an FTB is present in a cluster and the "actual" and predicted target addresses do not match.

Validation control block 854 also provides a predicted predicate for the predicted FTB to predicate validation block 856, where it is compared with the actual predicate provided through bypass input 858. Predicate validation block 856 asserts an input to OR gate 862 if the predicted and actual predicates for the FTB do not match.

Loop validation module 770 includes logic for determining the branch direction of loop branches using speculative EC and LC values and predicted predicate values. For one embodiment of loop validation module 770, relevant EC and LC values are determined from a previous cycle to limit timing constraints. Loop validation module 770 asserts an output signal when a predicted first taken loop branch is invalidated.

OR gate 862 receives invalidation signals from loop validation module 770, predicate validation module 856, and AND gate 860 (target address validation). The output of OR gate 862 is coupled to an exception/commit module 160 in stage 306, which generates a flush signal when any invalidation signal to OR gate 862 is asserted.

Figure 9:
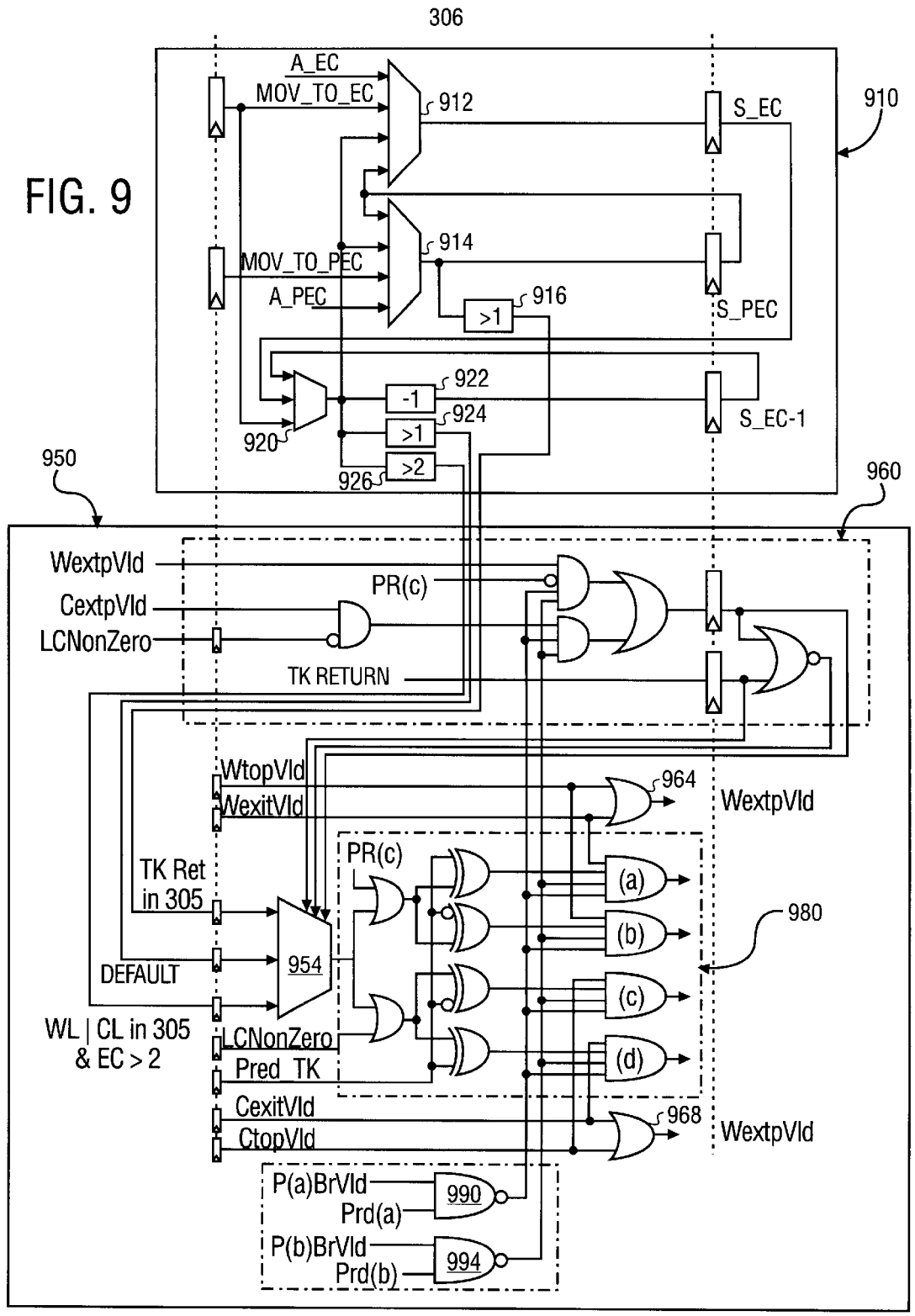
FIG. 9 is a circuit diagram of one embodiment of the loop validation module of FIG. 7.

FIG. 9 illustrates in greater detail one embodiment of loop validation module 770. Loop validation module 770 compares a predicted branch direction (P_TK) against EC, LC, and predicate (PR) values, as needed to determine whether a misprediction has occurred. For the disclosed embodiment, EC and LC values from a previous clock cycle are used for the branch instruction currently in stage 305, in order to reduce the timing constraints on validation logic in stage 305. In addition, by-passes are provided for selected instruction sequences that raise timing problems. For example, where consecutive branch instructions are being processed, the EC, LC, PEC values from the first processed branch instruction may not be updated in time to evaluate the accuracy of the second processed branch instruction. The by-pass makes the appropriate loop variables available for validation in a timely manner.

The disclosed embodiment of loop validation module 770 includes an update block 910 and a comparison block 950. Update block 910 provides appropriate values of loop variables from a clock cycle N to comparison block 950 for validation in cycle N+1. For example, update block 910 intercepts loop variables from all writers of S_EC and selects appropriate values for updating S_EC and S_PEC using MUXs 912 and 914, respectively. A S_PEC gating block 916 compares a selected S_PEC value against 1 when a return is detected in stage 305. A MUX 920 couples values of S_EC to EC-gating blocks 922, 924 and decrementing block 926. EC gating blocks 922, 924 and S_PEC gating block 916 indicate EC statuses for loop branches, consecutive loop branches, and loop branches following returns, respectively. Comparison block 950 uses the EC status information to validate the branch when it enters stage 305.

Comparison logic 950 includes EC select MUX 954, by-pass logic 960, OR gates 964, 968, mispredict logic 980, and NAND gates 990, 994. The disclosed embodiment is suitable for the case in which loop branches are processed in pipeline 210(c). For this embodiment, NAND gates 990, 994 disable portions of bypass logic 960 and mispredict logic 980 when an earlier branch (in execution order) from the same cluster is resolved taken. In this case, the current loop branch does not need to be validated, since its results is ignored.

Bypass logic 960 operates with MUX 954 to provide an appropriate EC status check to mispredict logic 980. For the disclosed embodiment, bypass logic 960 determines when the default EC status check, provided by gating logic 924, must be bypassed to accommodate timing constraints on EC updates. For example, when a modulo-scheduled loop precedes the current branch instruction in stage 305, bypass logic 960 directs the EC status check from gating logic 922 to mispredict logic via MUX 954. This allows the EC update from the modulo-scheduled loop to be incorporated in the analysis of the current branch instruction. For this purpose, OR gates 964 and 968 determine when modulo-counted and module-while loop branch instructions, respectively, precede the current branch instruction in stage 305.

Similarly, when a taken return precedes the current branch instruction in stage 305, bypass logic 960 directs the EC status check from gating logic 916 (S__PEC>1) to mispredict logic 980 via MUX 954. In this case, S__PEC stores the speculative EC value of the branch to which the taken return branch returns control. If neither bypass condition is detected, bypass logic directs the EC status check from gating logic 924 to mispredict logic 980.

Mispredict logic 980 uses the status of S__EC, S__LC, and the predicate value for the branch instruction in stage 305 (PR(c)) to determine the TK/NT status of the branch instruction and compare it against the predicted value (Pred__TK). For the disclosed embodiment, signals at the outputs of AND gates 982(*a*), 982(*b*), 982(*c*), or 982(d) are asserted when a WTOP, WEXIT, CEXIT, or CTOP branch instruction, respectively, is mispredicted.

Figure 10:
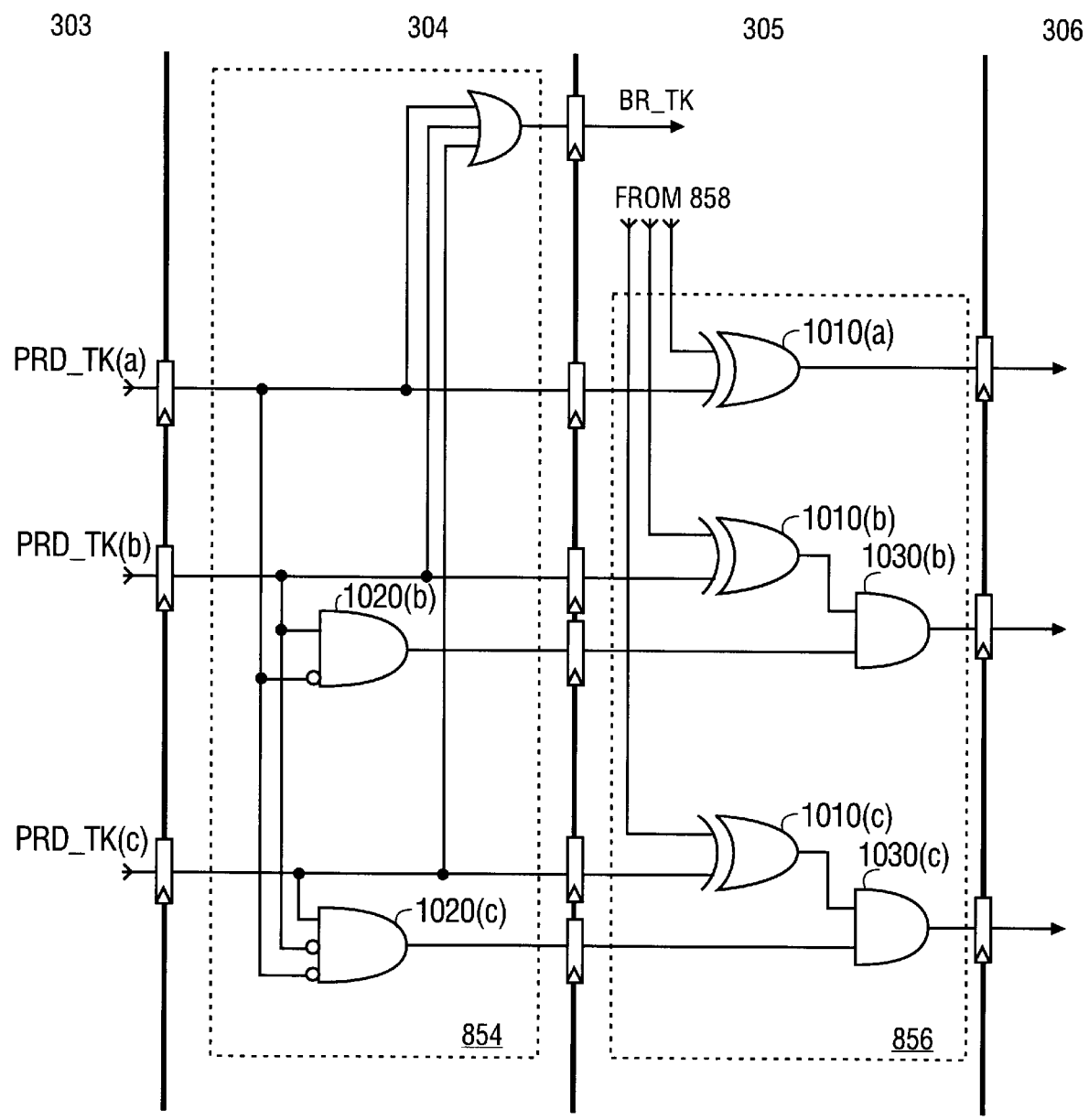
FIG. 10 is a circuit diagram of one embodiment of the predicate handling and predicate validation logic of FIG. 8.

FIG. 10 is a circuit diagram of embodiments of predicate control and validation logic 854, 856, respectively, in accordance with the present invention. Predicate control logic 854 receives predicted predicates (PRED__TK[3]) and determines which pipeline 210, if any, includes a FTB for a given branch cluster. Predicate validation logic 856 compares predicted and resolved branch predicates in pipe stage 305, and asserts a mismatch signal when the comparison fails for the FTB. For the disclosed embodiment, predicated predicates are provided by branch prediction module 120 and resolved predicates may be provided through input 858.

Predicate control logic 854 includes AND gates 1020(*b*) 1020(*c*) and OR gate 1022. AND gate 1020(*g*) generates an enable signal if branches in pipelines 210(*a*) and 210(*b*) are predicted NT and TK, respectively. AND gate 1020(*c*) generates an enable signal if branches in pipelines 210(*a*), 210(*b*), and 210(*c*) are predicted NT, NT, and TK. OR gate 1022 asserts BR__TK if a branch in any pipeline 210 is predicted TK.

Predicate validation logic 856 includes XOR gates 1010(*a*)–1010(*c*) and AND gates 1030(*b*), 1030(*c*). XOR gates 1010(*a*)–1010(*c*) compare predicted predicates with resolved predicates for pipelines 210(*a*)–210(*c*) and assert invalidation signals when a mismatch is detected. AND gates 1030(*b*) and 1030(*c*) mask invalidation signals from XORs 1010(*b*) and 1010(*c*) when the predicted FTB is in an earlier pipeline 210 in execution order. For example, AND gate 1030(*b*) is enabled by predicate control logic 854 only if branches in pipelines 210(*a*) and 210(*b*) are predicted NT and TK, respectively. AND gate 1030(*c*) is enabled by predicate control logic 854 only if branches in pipelines 210(*a*), 210(*b*), and 210(*c*) are predicted NT, NT, and TK, respectively.

Validation module 170 provides a final check on predicted versus actual results by stage 305. Even when the predicted results are validated, however, faults may prevent the results from being committed. Validated results from branch processing system 140 are only committed to the architectural state of the thread when no instruction that precedes the first taken branch generates a fault. In the embodiment in which only one execution pipeline 210 includes loop pipeline 330, a fault may be generated when a loop instruction is scheduled into an execution pipeline 210(*a*) or 210(*b*), since neither has the hardware resources necessary to execute loop branches. When this or any other fault is generated, control is passed to a fault handler, independent of the resolution of the branch instructions in the cluster, and results from linking logic 220 are not committed.

Figure 11:
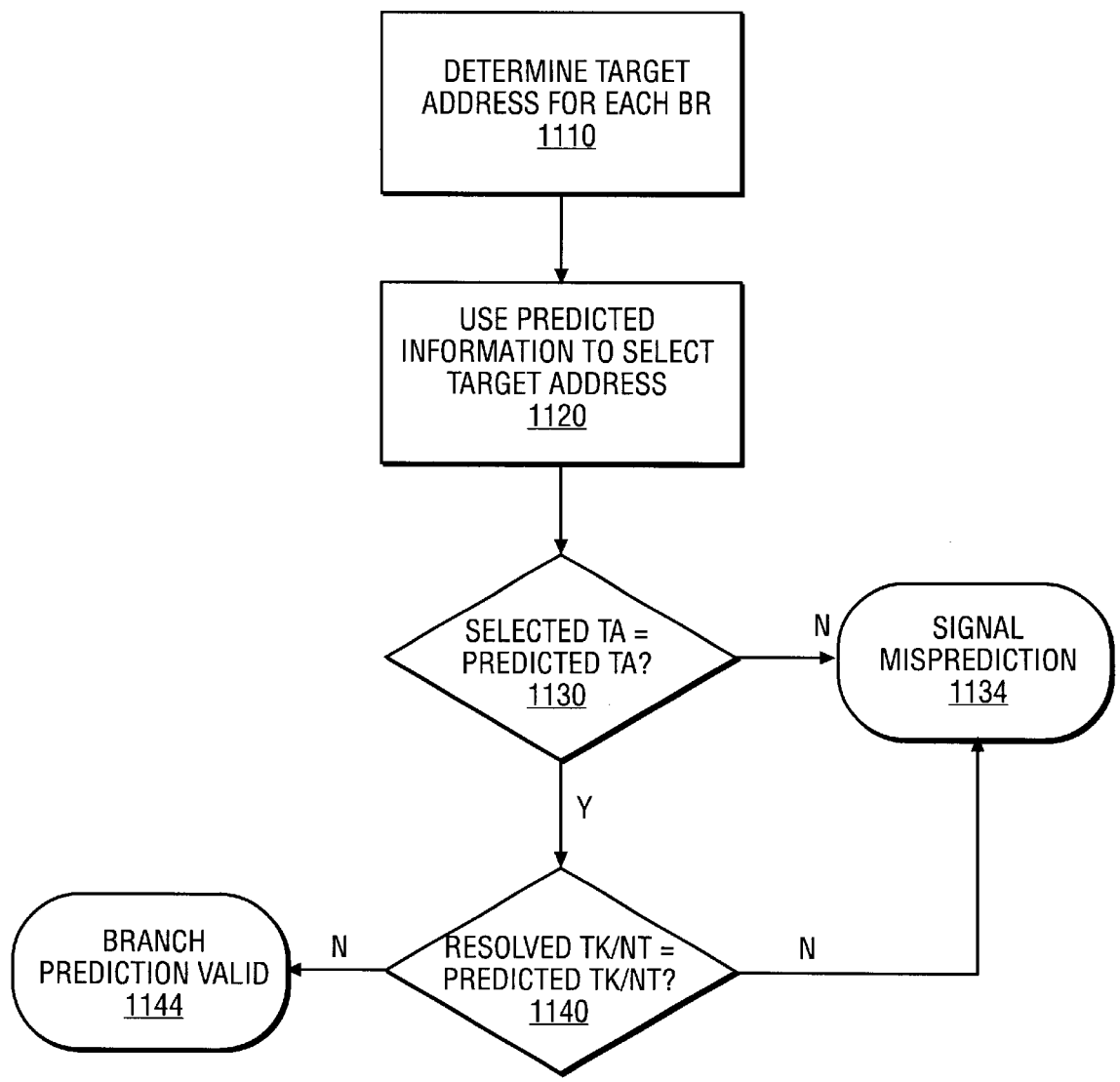
FIG. 11 is a flow chart illustrating a method in accordance with the present invention for validating branch instructions.

FIG. 11 is a flow chart representing a method in accordance with the present invention for validating branch prediction information. At Step 1110, target addresses are determined for each branch instruction in a cluster of branch instructions. At step 1120, branch prediction information is used to select on of the determined target addresses as the target address for the cluster. Where the cluster includes multiple branch instructions, the selected target address is the target address associated with the first branch instruction in execution order that is predicted to be taken (predicted FTB). The selected branch instruction is then compared 1130 with the predicted branch instruction. If the selected and predicted target address do not match, a branch misprediction is indicated 1134.

If the selected and predicted target addresses match, predicted and resolved TK/NT status are compared 1140. If the predicted and resolved TK/NT status match, the branch prediction is validated 1144. In this case, pipeline 100 may continue processing any instructions prefetched on the basis of a TK prediction for the branch. If the predicted and resolved branch status do not match, a misprediction is indicated 1134. For one embodiment of the invention, fetch module 110 at the front end of pipeline 100 is resteered using the a target address calculated by the branch execution pipeline associated with the first taken branch.

There has thus been provided a system for processing clustered branch instructions concurrently. The clustered branch instructions are each assigned to a branch execution pipeline and processed to determine their resolution and target addresses (if resolved taken). Linking logic identifies a first taken branch from the cluster and updates the architectural state of an associated thread to reflect the taken branch. Resolution and target information from later executed instructions are suppressed. For one embodiment of the invention, predicted branch information is validated against resolved branch information for the first taken branch, and the pipeline is resteered if a misprediction is detected.

What is claimed is:

1. A branch system comprising:

a branch predictor to predict a target address for an instruction cluster that includes one or more branch instructions;

an address generator to determine target addresses for the branch instructions of the cluster;

a target address validation module to select one of the determined target addresses as a tentative target address, responsive to predicted directions for the branch instructions and to compare the tentative target address with the predicted target address; and a condition validation module to compare the predicted branch directions with resolved branch directions and trigger a resteer signal when either comparison indicates a mismatch.

2. The branch validation system of claim 1, wherein the target address generator further comprises first and second target address generators, the second target address generator to determine target addresses for selected time-critical branch instructions and the first target address generator to determine target addresses for non-time critical branch instructions.

3. The branch validation system of claim 2, wherein the selected time-critical branch instructions are branch instructions for which bypass data to determine the target addresses of the branch instructions is generated within a selected number of clock cycles of the target address determination.

4. The branch validation system of claim 1, wherein the target address validation module determines a predicted first taken branch from the predicted branch directions and selects as the tentative target address the determined target address associated with the predicted first taken branch.

5. The branch validation system of claim 1, wherein the tentative target address and predicted branch directions are validated in parallel with a cluster of concurrently processed branch instructions.

6. The branch validation system of claim 5, wherein the condition validation module converts predicted branch directions to predicted predicate information for comparison with resolved predicate information.

7. A method for validating branch instructions comprising:
    predicting a target address for an instruction cluster;
    calculating target addresses for each branch instruction of the cluster;
    predicting a first taken branch for the instruction cluster;
    selecting a tentative target address from the one or more calculated target addresses according to the predicted first taken branch; and
    comparing the tentative target address with the predicted target address to detect a branch misprediction.

8. The method of claim 7, wherein predicting the first taken branch comprises:
    receiving a predicted branch direction for each branch instruction of the cluster; and
    identifying the first branch instruction having a taken predicted branch direction.

9. The method of claim 8, further comprising:
    receiving resolved branch directions for the branch instructions of the cluster;
    comparing the resolved branch directions with the predicted branch directions; and
    indicating a misprediction when the target address comparison or the branch direction comparison fails.

10. A processor comprising:
    a branch prediction system to predict a first taken branch and an associated target address for a cluster of branch instructions;
    a branch execution system to process the branch instructions of the cluster concurrently and identify an actual first taken branch; and
    a branch validation module to select from target addresses calculated for the branch instructions a tentative target address for the clustered branch instructions using the predicted first taken branch and to compare the tentative target address with the predicted target address.

11. The processor of claim 10, wherein the branch validation module includes a predicate validation module to compare predicted and resolved branch directions for the branch instructions and provide an invalidation signal when the direction or target address comparison fails.

12. The processor of claim 10, wherein the branch validation system employs predicted predicates to validate the predicted target address and the predicted first taken branch as the branch execution system resolves actual branch directions for the cluster of branch instructions.

13. The processor of claim 10, wherein the branch validation system operates in parallel with the branch execution system to validate the predicted target address for the cluster of branches as the branch execution system completes processing the branches.

14. A branch validation module comprising:
    a target validation module, the target validation module to select a tentative target address from a plurality of target addresses determined from a cluster of concurrently processed branch instructions and to compare the tentative target address with a predicted target address; and
    a condition validation module to compare one or more predicted and resolved branch directions and to trigger a resteer signal if the target address or direction comparison fails.

15. The branch validation system of claim 14, wherein the condition validation system includes a predicate validation system to validate non-loop branches in the cluster and a loop module to validate loop branches in the cluster.

16. The branch validation system of claim 14, wherein the resolved branch directions are provided by processing the clustered branch instructions in parallel with validating the processed branch instructions.

17. A processor comprising:
    a branch prediction system to predict a first taken branch and a target address for a cluster of branch instructions;
    branch execution means to process the cluster of branch instructions concurrently and resolve a first taken branch; and
    branch validation means to select a tentative target address for the cluster of branch instructions from target addresses calculated for the branch instructions, using the predicted first taken branch, and to compare the tentative and predicted target addresses.

18. The processor of claim 17, wherein the branch execution means includes a plurality of branch execution pipelines, each capable of processing one of the branch instructions in the cluster and linking logic to determine a first taken branch of the cluster.

19. The processor of claim 17, wherein the branch validation means includes a plurality of address generators to determine a plurality of target addresses from the branch instructions of the cluster.

20. The processor of claim 19, wherein the branch validation means further includes logic to determine the first taken branch using predicted branch directions for the clustered branch instructions.

21. The processor of claim 20, wherein the logic is coupled to the plurality of address generators to select a target address for the clustered branch instructions according to the predicted first taken branch.

22. The processor of claim 21, wherein the branch prediction means further comprises condition validation means to compare predicted branch directions with resolved branch directions from processed branches and generate a resteer signal when a mismatch is detected.

23. The processor of claim 18, wherein the branch validation means includes a target address generator to determine target addresses for each branch of the cluster, selection logic to select a target address corresponding to the predicted first taken branch of the cluster, and a comparator to compare the selected target address with a resolved target address from the branch execution means.

24. The processor of claim 23, wherein the branch validation means further includes a condition validation module to compare predicted and resolved branch directions and generate a resteer signal if a mismatch is detected for the branch direction or target address.

25. The processor of claim 24, wherein the branch validation means implements target address and branch condition validation in parallel with target address and branch condition resolution implemented by the branch execution means.

* * * * *